(12) United States Patent
Barth et al.

(10) Patent No.: US 7,815,205 B2
(45) Date of Patent: Oct. 19, 2010

(54) COUPLING MECHANISM FOR ANTI-ROLL BAR

(76) Inventors: Laurent Barth, 6 rue des Capucins, Compiegne 60200 (FR); Xavier Delayre, 19 rue Carle Hebert, Courbevoie 92400 (FR)

( * ) Notice: Subject to any disclaimer, the term of this patent is extended or adjusted under 35 U.S.C. 154(b) by 1159 days.

(21) Appl. No.: 11/401,196

(22) Filed: Apr. 10, 2006

(65) Prior Publication Data

US 2006/0273539 A1    Dec. 7, 2006

(30) Foreign Application Priority Data

Jun. 6, 2005    (EP)    ................... 05300456

(51) Int. Cl.
*B60G 21/055*    (2006.01)
(52) U.S. Cl. .............................. 280/124.107
(58) Field of Classification Search .......... 280/124.106, 280/124.107, 124.166; 267/277
See application file for complete search history.

(56) References Cited

FOREIGN PATENT DOCUMENTS

| EP | 1514705 A | 3/2005 |
|---|---|---|
| FR | 2836093 A | 8/2003 |
| JP | 2000203232 A | 7/2000 |

*Primary Examiner*—Faye M. Fleming
(74) *Attorney, Agent, or Firm*—Dickinson Wright PLLC

(57) ABSTRACT

Coupling mechanism for a vehicle anti-roll bar comprising a first piece able to be fixed to a first half-bar, a second piece able to be fixed to a second half-bar, the second piece being so arranged as to be moveable in rotation about an axis of rotation A relative to the first piece. The mechanism includes at least one elastically deformable elongate element coupled to the first and second pieces so that relative rotation of the first and second pieces about the axis of rotation A causes elastic flexion deformation of the at least one elongate element, the mechanism including an actuator able to position the at least one elongate element in a first state in which the said at least one elongate element presents a first flexion stiffness for the said elastic flexion deformation, and a second state in which the said at least one elongate element presents a second flexion stiffness for the said elastic flexion deformation.

22 Claims, 5 Drawing Sheets

COUPLING MECHANISM FOR ANTI-ROLL BAR

TECHNICAL FIELD

The present invention relates to vehicle anti-roll bars. More particularly, the present invention relates to an electromechanical coupling mechanism for an anti-roll bar.

BACKGROUND OF THE INVENTION

When a vehicle turns, the lateral acceleration produces a moment, orientated with respect to the longitudinal axis of the vehicle, causing a change in the seating of the vehicle body: the torque rods of the wheels positioned inside the bend are subject to a different load from that to which the torque rods situated on the outside of the bend are subject. Relative to the body, the wheel supports are displaced by a different amount along the (virtually vertical) axes of the torque rods. Relative to the axis passing through the wheels of a set of wheels, the body is inclined by an angle known as the angle of roll.

In order to reduce the roll of a vehicle, it is known to provide the front set of wheels and/or the rear set of wheels with a passive anti-roll device. This consists of a generally U-shaped torsion bar, including a rectilinear central portion orientated in the direction of the axis of the wheels of the set of wheels, and two arms situated at each of the ends of the said central portion and generally extending perpendicularly to this. The central portion is connected to the body by a connection of pivot type permitting rotation of the bar about the axis of the central portion. The free ends of the arms are respectively connected to each of the wheel supports (for example to the hub carrier or the lower portion of the torque rod of each of the wheels).

In a bend, the difference in the amount of vertical displacement of the wheel supports deforms the torsion bar so that an angle of torsion appears between its arms. An elastic return torque is thus created, opposing the movement of the wheel supports and reducing the roll motion of the body. No energy is contributed to the anti-roll device, which is then qualified as passive.

Although the roll of the vehicle and, consequently, passenger comfort, is improved in bends the torsion bar reduces the isolation of the body relative to the road. In a straight line, a shock caused by an unevenness on the road will be felt by the passengers. Moreover, the handleability of the vehicle is modified.

Active anti-roll devices are known. For example, the document U.S. Pat. No. 6,425,585 discloses an electromechanical active anti-roll device. In this device, the U-shaped anti-roll bar is formed of two half-bars connected to each other at the central portion of the anti-roll bar by means of a coupling mechanism. This type of device is qualified as active as the coupling mechanism is able to generate and apply a counter-torque between the two half-bars. It is necessary to contribute energy to the coupling mechanism to generate this counter-torque.

Electromechanical semi-active anti-roll devices are also known which permit selective coupling or decoupling of the first and second half-bars. No pre-stress is then applied between the two half-bars, and such semi-active anti-roll devices do not require energy contribution to create a counter-torque. The document EP 1 157 865 discloses a series of embodiments of an electromechanical semi-active anti-roll device including clutches, brakes or the equivalent permitting coupling/decoupling of the two half-bars as a function of a command emitted by a control unit on the basis of measurements of the displacement of the torque rods taken by appropriate sensors. The coupling/decoupling can for example be of the "on/off" type or of the "proportional" type so that an impact on one wheel is not transmitted to the other wheel. In certain embodiments of this document, it is necessary to contribute a large amount of energy to maintain the device in a coupled or decoupled state. In other embodiments, it is necessary to contribute a large amount of energy to switch the device from a coupled state to a decoupled state or vice versa.

Moreover, it is necessary for the vehicle to be in a state in which the torsion bar is not twisted to pass from a totally or partially decoupled state to the coupled state, to prevent the anti-roll bar from continuously applying a return torque even when this is not necessary.

The document EP 0 974 477 describes an anti-roll bar including a semi-passive coupling mechanism of variable stiffness. The coupling mechanism comprises a fluid coupling filled with electrorheological fluid. For this mechanism to present a given stiffness, it is necessary to continuously apply an electrical field of corresponding amplitude to the electrorheological fluid. This mechanism therefore requires a large amount of energy. Moreover, fluid coupling must present meanders and be properly sealed. It is therefore bulky and expensive.

SUMMARY OF THE INVENTION

The aim of the invention is to resolve at least certain of the above-mentioned disadvantages.

The invention therefore provides a coupling mechanism for a vehicle anti-roll bar comprising a first piece able to be fixed to a first half-bar, a second piece able to be fixed to a second half-bar, the second piece being so arranged as to be moveable in rotation about an axis of rotation A relative to the first piece, characterised by the fact that it includes at least one elastically deformable elongate element coupled to the first and second pieces so that relative rotation of the first and second pieces about the axis of rotation A causes elastic flexion deformation of the said at least one elongate element, the mechanism including an actuator able to position the said at least one elongate element in a first state in which the said at least one elongate element presents a first flexion stiffness for the said elastic flexion deformation, and a second state in which the said at least one elongate element presents a second flexion stiffness for the said elastic flexion deformation.

This mechanism therefore presents a variable torsion stiffness, and does not consume much energy. In fact, the only energy necessary is that required by the actuator to position the at least one elongate element in a given state. Moreover, it is possible to pass from the first state to the second state and vice versa even when the first piece and the second piece are in rotation relative to a neutral position. Thus, by means of this mechanism, it is possible to selectively change the stiffness of an anti-roll bar while the vehicle is being driven. Lastly, the forces transmitted by one half-bar to the other are supported by the elongate element or elements so that it is not necessary to have these forces supported by an actuator. In other words, this coupling mechanism is suitable to form a semi-active anti-roll device.

Preferably, the said at least one elongate element is arranged substantially parallel with the said axis of rotation A of the said first and second pieces, the said at least one elongate element being coupled to the said first and second pieces at coupling points situated distant from the said axis of rotation A, the said at least one elongate element being moveable in rotation at least about its longitudinal axis relative to the said first and second pieces, the said actuator being able to rotate the said at least one elongate element about the longitudinal axis of the said elongate element.

Due to these characteristics, the energy consumed is particularly small as the rotation of an elongate element about its longitudinal axis only requires a small amount of energy.

Advantageously, the said at least one elongate element has a cross-section which presents a first moment of inertia along a first axis z and a second moment of inertia along a second axis y, the said elastic flexion deformation being a flexion perpendicularly to an axis of flexion Z, the said first axis z corresponding to the said flexion axis Z in the said first state, the said second axis y corresponding to the said axis of flexion Z in the said second state.

Thus, the said at least one elongate element can easily be made in the form of a rod of non-circular section.

In accordance with a particular embodiment, the said at least one elongate element is cylindrical with rectangular section.

Preferably, the said at least one elongate element is made from orthotropic material.

Use of an orthotropic material also permits formation of an elongate element, for example of circular section, presenting first and second flexion stiffnesses. Moreover, in combination with the above characteristics relative to the moment of inertia, it is possible to accentuate the difference between the first and second flexion stiffnesses.

Advantageously, the mechanism includes at least one stop so arranged as to define the said first state and/or the said second state of the said at least one elongate element.

Thus, control of the actuator may be effected in simple manner, as it is sufficient for the actuator to displace the elongate element until it is detected that this has arrived in a stop position. Preferably, the said actuator is able to position the said at least one elongate element in a plurality of states corresponding, for the said elastic flexion deformation, to a plurality of flexion stiffnesses of the said at least one elongate element. Due to these characteristics, the coupling mechanism with variable torsion stiffness may present more than two different torsion stiffnesses.

Preferably, the said at least one elongate element is coupled rotatably to at least one of the said first and second pieces, by a pivot connection, the said actuator being able to cause the said at least one elongate element to rotate.

Advantageously, the said at least one elongate element is rotatably coupled to one of the said first and second pieces by a swivel joint connection.

Preferably, the mechanism includes a plurality of elongate elements uniformly distributed about the said axis of rotation A.

Advantageously, the said actuator is coupled to the said elongate elements by a synchronous transmission mechanism co-operating with the said actuator to jointly so position the said elongate elements that all the elongate elements are always positioned in a substantially identical state corresponding to a substantially identical flexion stiffness, for the said elastic flexion deformation.

Preferably, the said actuator is coupled to the said elongate elements by a transmission mechanism co-operating with the said actuator to position the said at least one elongate element, the said transmission mechanism being an irreversible mechanism able to transmit a drive force from the said actuator to the said at least one elongate element without substantially transmitting the forces from the said at least one elongate element to the said actuator.

Advantageously, the said actuator is an electric motor.

Preferably, the said first piece comprises a case protecting the said actuator and the said at least one elongate element, the said actuator being fixed to the said case.

The invention also provides an electromechanical semi-active anti-roll device to be fitted to a set of wheels of a motor vehicle in which each of the wheels of the said set of wheels is coupled with vertical mobility to a body of the said vehicle, the said anti-roll device including a U-shaped torsion bar having a central portion intended to be mounted firmly attached to the said body and parallel with an axis of the said set of wheels, and first and second lateral arms the free ends of which are intended to be respectively coupled to supports of the said wheels; the said torsion bar being composed of a first half-bar and a second half-bar connected one to the other at the said central portion by means of a coupling mechanism with variable torsion stiffness able to be controlled to couple the said first and second half-bars together with a variable stiffness, characterised by the fact that the said coupling mechanism is a mechanism in accordance with the above object of the invention.

Preferably, the device includes at least one sensor able to measure at least one kinematic variable of the said vehicle; and a control unit able to acquire the said at least one kinematic variable and emit a control signal corresponding to the said kinematic variable to the said coupling mechanism to actuate this.

Advantageously, the device includes a sensor intended to be manipulated by a driver of the said vehicle to actuate the said coupling mechanism.

The invention also provides a vehicle including an anti-roll device in accordance with the above object of the invention.

BRIEF DESCRIPTION OF THE DRAWINGS

The invention will be better understood and other aims, details, characteristics and advantages of it will become more clearly apparent in the course of the following description of a particular embodiment of the invention, given solely in illustrative and non-limiting manner, with reference to the attached drawings. In these drawings.

DESCRIPTION OF THE PREFERRED EMBODIMENT

Figure 1:
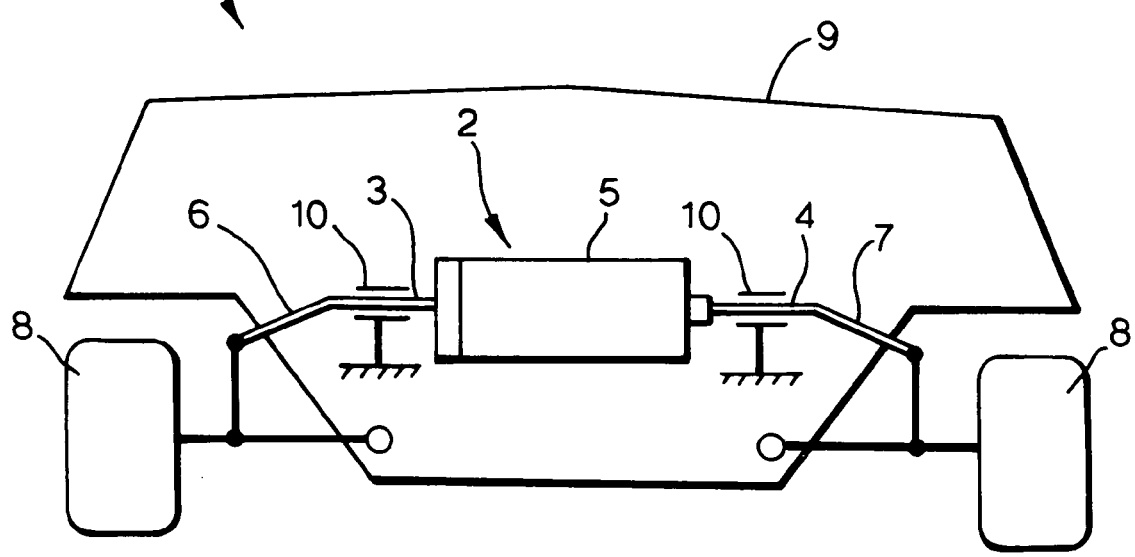
FIG. 1 is a partial diagrammatic view of a vehicle fitted with an anti-roll bar including a coupling mechanism in accordance with one embodiment of the present invention.
Figure 2:
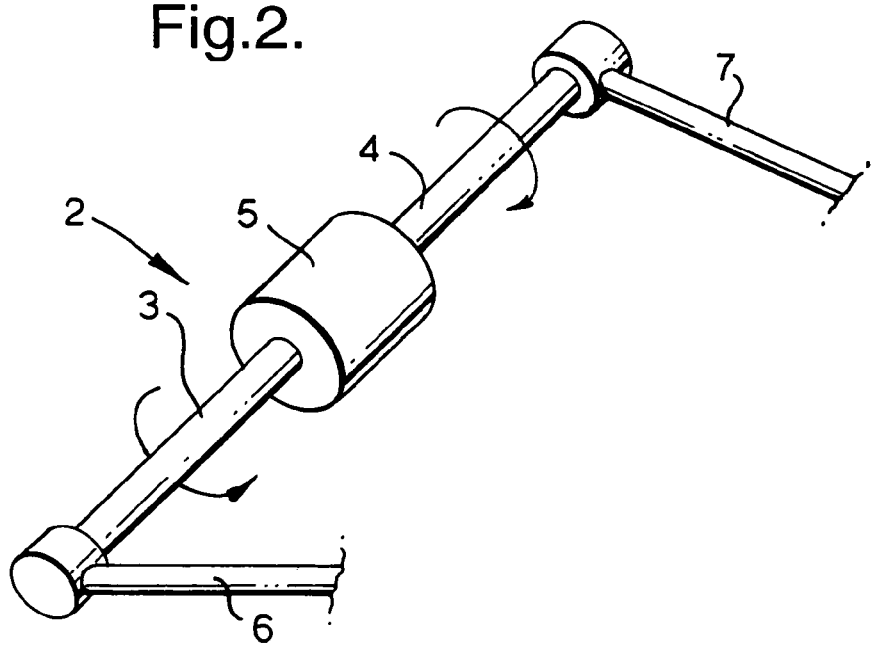
FIG. 2 is a perspective view of the anti-roll bar and the coupling mechanism of FIG. 1.

With reference to FIGS. 1 and 2, the vehicle 1 is fitted with a semi-active anti-roll device 2. The anti-roll device 2 comprises a central portion composed of two half-bars 3 and 4 aligned along an axis A (FIG. 3) parallel with the axis of the set of wheels 8. This may be the front and/or rear set of wheels. The half-bars 3 and 4 are connected by a coupling mechanism 5.

The device 2 also comprises two lateral arms 6 and 7 connected to the ends of the half-bars 3 and 4 so as to form a U-shaped torsion bar. The ends of the lateral arms 6 and 7 are coupled to supports of the wheels 8, for example to the torque rods of the wheels 8. The half-bars 3 and 4 are coupled to the body 9 of the vehicle 1 by means of connecting pivot bearings 10.

When, in a bend, the body 9 leans at a given angle of roll $\alpha$, the anti-roll device is in a state of torsion at an angle of torsion per unit length $\theta$ which depends on the angle $\alpha$.

Figure 9:
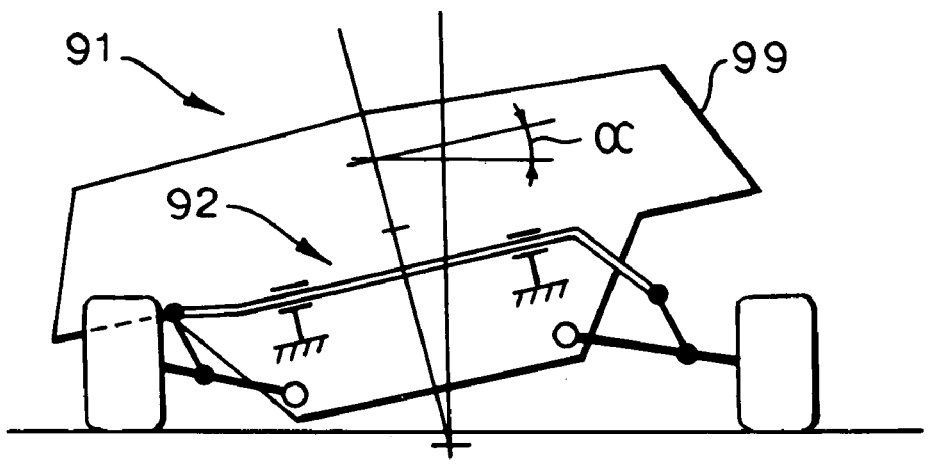
FIG. 9 is a view similar to FIG. 1, in which a vehicle is fitted with a passive anti-roll bar, in accordance with the prior art.
Figure 10:
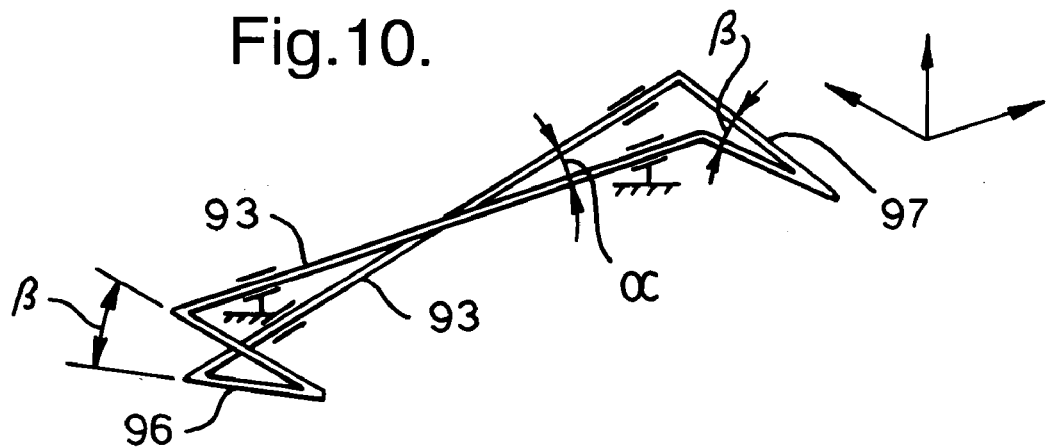
FIGS. 10 and 11 show the anti-roll bar of FIG. 9.
Figure 11:
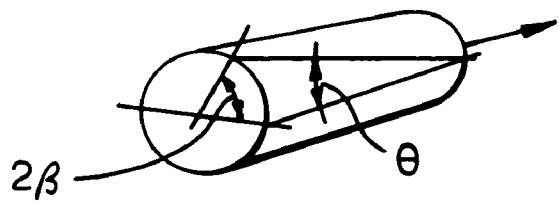

FIGS. 9, 10 and 11 show the relationship between the angle of roll $\alpha$ and the angle of torsion $\theta$, for a vehicle 91 fitted with a passive anti-roll bar 92 in accordance with the prior art, comprising a central portion 93 of length $l_c$ and two lateral arms 96 and 97 of length R. In FIG. 10, the bar 92 is shown in its neutral position, i.e. when the lean of the body 99 is zero, and in a position corresponding to an angle of roll $\alpha$. As shown in FIG. 11, the angle of torsion $\theta$ is given by $\theta=2\beta/l_c$, with the relationship $\beta R=\alpha l_c/2$, as shown in FIG. 10. Thus we have $\theta=\alpha/R$. When the body 99 leans by an angle $\alpha$, the anti-roll bar 92 applies an elastic return torque T which tends to return the body 99 into its neutral position, with $T=G\,\theta I_0$. In this expression, G is the transversal modulus of elasticity of the material of the bar 92, and $I_0$ is the moment of inertia of the central portion 93 and has the value, in the case of a cylindrical central portion 93 of circular section of radius r, of $I_0=\pi(2r)^4/32$. The ratio between the return torque T and the angle of torsion per unit length $\theta$ is called the torsion stiffness of the anti-roll bar. As shown, in the bar 92, the torsion stiffness is constant. The torque T can also be expressed as a function of the angle of roll $\alpha$: $T=GI_0\alpha/R$.

The device 2 also presents a certain torsional stiffness, but in this case the coupling mechanism 5 permits variation of this torsional stiffness, as will be explained below.

Figure 3:
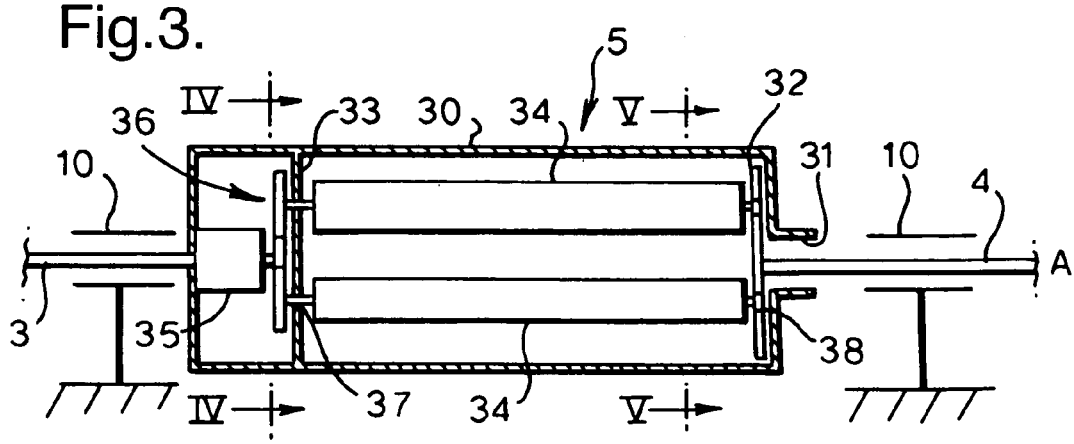
FIG. 3 is a view in axial section of the anti-roll bar and the coupling mechanism of FIG. 1.

With reference to FIG. 3, the coupling mechanism 5 comprises a case 30, of generally circular cylindrical shape, the axis of which coincides with the axis A. The case 30 for example has a diameter of between 100 and 250 mm and a length of between 200 and 800 mm. The half-bar 3 is firmly fixed to one of the ends of the case 30. At its opposite end, the case 30 is coupled moveably in rotation to the half-bar 4. The half-bar 4 is fixed firmly to a circular plate 32 arranged inside the case 30. Thus, relative rotation of the half-bars 3 and 4 about the axis A causes relative rotation of the case 30 relative to the plate 32 about the axis A.

In the example shown, the half-bar 4 enters the case 30 through a bore 31, at which the case 30 and the half-bar 4 are coupled by a connection of pivot type. In accordance with a modified embodiment, the connection of pivot type may be situated between the plate 32 and the case 30.

The case 30 presents a transversal wall 33 arranged parallel with the plate 32. Between the transversal wall 33 and the plate 32, the case 30 includes three flexible rods 34. The rods 34 are made of an elastically deformable material, for example of steel or a composite material. The rods 34 are coupled to the wall 33 by connections 37, distributed around the wall 33 at a distance from the axis A and at 120° from each other. By way of a modification, there could be more or less than three flexible rods 34, uniformly distributed around the axis A. The connections 37 are of pivot type, permitting rotation of the flexible rods 34 about their longitudinal axes, relative to the wall 33.

The rods 34 are also coupled to the plate 32 by connections 38. When the coupling mechanism 5 is in a neutral position, corresponding to a zero angle of torsion of the anti-roll device 2, the connections 38 are situated in correspondence with the connections 37, so that the flexible rods extend parallel with the axis A. The connections 38 are of the pivot type or swivel joint type, permitting rotation of the flexible rods 34 at least about their longitudinal axes, relative to the plate 32.

As explained below, on operation of the coupling mechanism 5, the flexible rods 34 are deformed by flexion following a relative rotation of the case 30 and of the plate 32. The selection of connections 38 of the pivot or swivel joint type gives rise to conditions to the particular limits which lead to a particular flexion behaviour. Relative rotation of the case 30 and of the plate 32 causes an increase in the distance between the connections 37 and the corresponding connections 38. Preferably, to compensate for this increase, the connections 38 permit sliding of the flexible rods 34. For example, the connections 38 are sliding pivots or sliding swivel joints.

Figure 4:
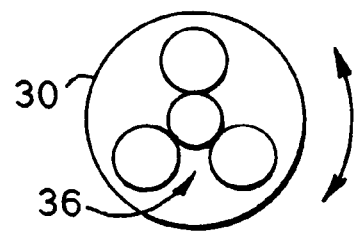
FIG. 4 is a sectional view of the coupling mechanism of FIG. 3, along the line IV-IV of FIG. 3.

The case 30 also includes a motor 35 and a transmission mechanism 36. The motor 35 is fixed to the case 30 and co-operates with the transmission mechanism 36. The transmission mechanism 36 can be of any appropriate type. As shown in FIG. 4, the transmission mechanism 36 is for example a mechanism with planetary gears which creates synchronous displacement of the three rods 34. Relative to the flexible rods 34, the motor 35 and the transmission mechanism 36 are situated on the opposite side of the wall 33. The rods 34 include end portions which pass through the wall 33 and are coupled to the transmission mechanism 36. Thus, the motor 35 allows the rods 34 to be turned about their longitudinal axes, relative to the case 30 and to the plate 32. It will be noted that no significant force opposes the rotation of the rods 34 about their longitudinal axes, at least when the torsion bar is in the neutral position. The motor 35 can therefore be a low power electric motor and therefore of small size and low cost.

The transmission mechanism 36 can be a reversible mechanism. However, the transmission mechanism 36 is preferably an irreversible mechanism, i.e. a mechanism which transmits forces from the motor 35 to the rods 34, without substantially transmitting forces from the rods 34 to the motor 35. Thus, if the rods 34 tend to enter a position different from the position imposed by the motor 35, for example under the influence of gravity or of flexion deformation, the motor 35 will not have to support forces.

Figure 15:
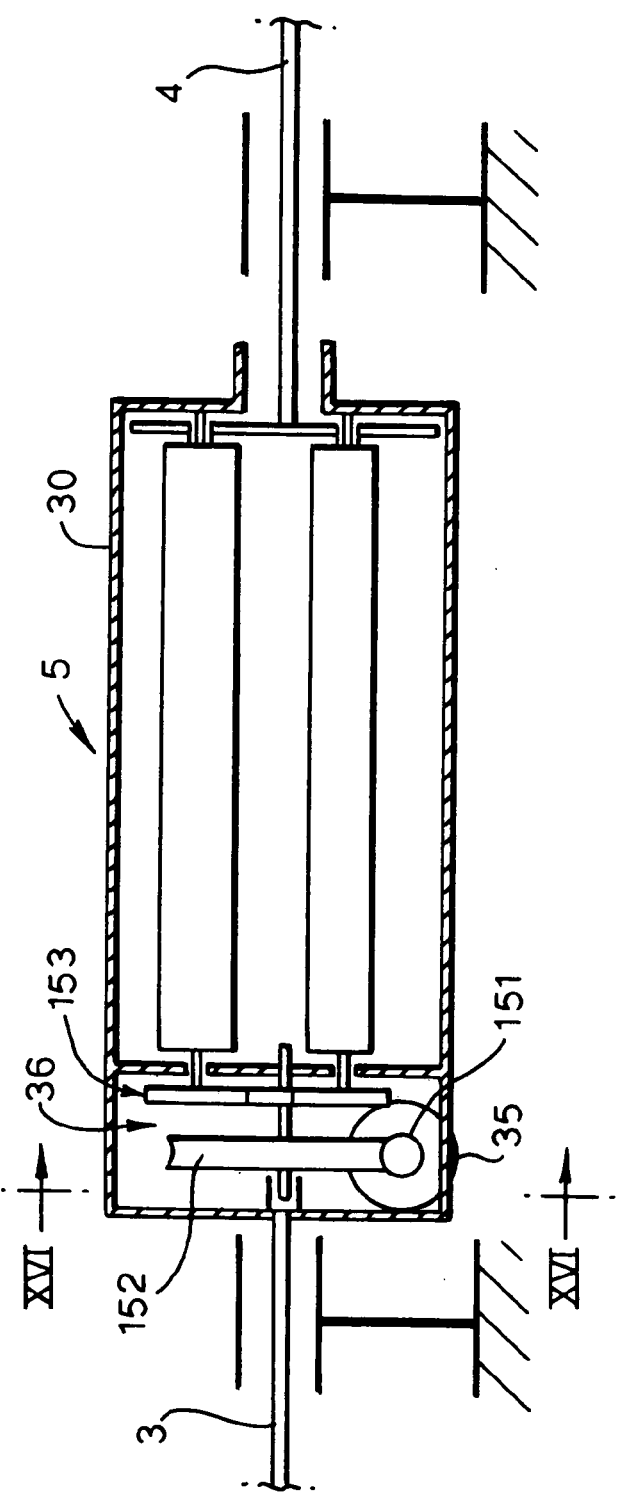
FIG. 15 is a view similar to FIG. 3, showing the coupling mechanism of FIG. 1 with a modified embodiment of the transmission mechanism.
Figure 16:
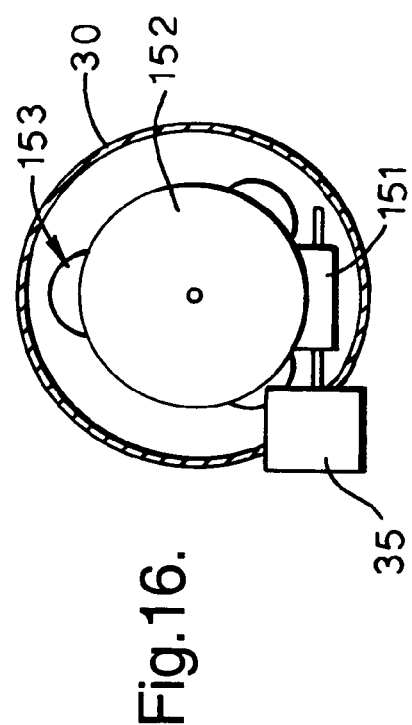
FIG. 16 is a sectional view of the coupling mechanism of FIG. 15, along the line XVI-XVI of FIG. 15.

A modified embodiment of the transmission mechanism 5, in which the transmission mechanism 36 is irreversible, is shown in FIGS. 15 and 16. In these figures, elements identical or similar to the elements of the modified embodiment of FIG. 3 are designated by the same reference numbers. The transmission mechanism 36 includes a worm-screw 151 of small diameter coupled to the motor 35. The worm-screw 151 is arranged at right-angles to the axis A and engages with a toothed wheel 152 of large diameter coupled to the rods 34 by means of a planetary gear stage 153. The motor 35 is shown partially outside the case 30, in which a suitable opening is formed. Of course, depending on the shape of the case 30 and the size of the motor 35, the motor 35 could be entirely inside the case 30 or entirely outside the case 30, and co-operate with the transmission mechanism 36 by means of a shaft passing through the case 30.

Alternatively to the use of an irreversible transmission mechanism 36, to prevent rotation of the rods 34 and the transmission of forces to the motor 35, the coupling mechanism 5 could include a brake able to immobilise the motor 35 and/or the transmission mechanism 36.

On operation of the anti-roll device 2, this can be twisted at an angle of torsion per unit length θ dependent on the angle of roll α. This angle of torsion per unit length θ corresponds to torsion of the half-bars 3 and 4 and to relative rotation of the case 30 and the plate 32. In the following, for the sake of simplification, it is considered that the half-bars 3 and 4 have a much greater torsion stiffness than the coupling mechanism 5 and that the angle of torsion θ corresponds virtually entirely to relative rotation of the case 30 and the plate 32 by an angle per unit length θ.

Figure 12:
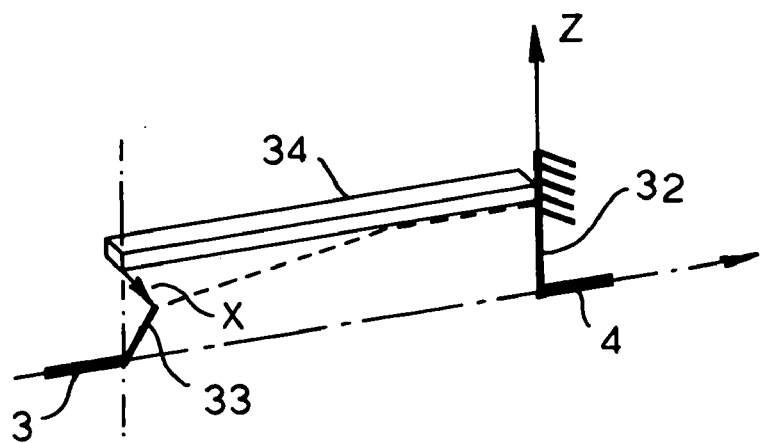
FIG. 12 is a diagrammatic representation of the deformation of an elongate element of the coupling mechanism of FIG. 3.

As already mentioned above, relative rotation of the case 30 and the plate 32 causes elastic flexion deformation of the flexible rods 34. FIG. 12 shows diagrammatically the flexion of a rod 34. Designating by $R_1$ the distance between the axis A and the connection 37 of the rod 34, and by $\beta$, $l_c$, R and T the magnitudes corresponding to the magnitudes $\beta$, $l_c$, R and T described above with reference to FIGS. 9 to 11, the deformation of the rod 34 may be expressed as $x=2 \cdot R_1 \cdot \beta = R_1 \cdot l_c \cdot \alpha / R$. For a rod 34 coupled to the plate 32 by a pivot, of length L, of modulus of elasticity E and the cross-section of which presents a moment of inertia $I_{gz}$ relative to the axis Z, the deformation x corresponds to a force $F=3 \, E \, I_{gz} x/L^3$. The ratio between the force F and the deformation x is called the flexion stiffness of the rod 34.

The return torque T applied by the coupling mechanism 5 is given by $T=3 \cdot F \cdot R_1$, for a mechanism comprising three rods 34. T can be expressed as a function of the angle α or of the angle θ: $T=9 \cdot R_1^2 \cdot l_c \cdot E \cdot I_{gz} \cdot \alpha/(R \cdot L^3) = 9 \cdot R_1^2 \cdot l c \cdot E \cdot I_{gz} \cdot \theta/L^3$. As shown in these expressions, the torsion stiffness of the device 2 depends of the flexion stiffness of the rods 34. Thus, by varying the flexion stiffness of the rods 34, the torsion stiffness of the device 2 can be varied.

Figure 5:
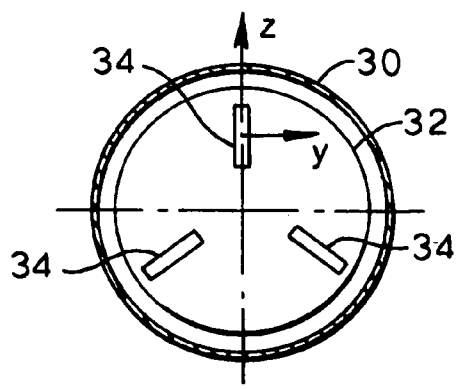
FIG. 5 is a sectional view of the coupling mechanism of FIG. 3 in a first state, along the line V-V of FIG. 3.
Figure 6:
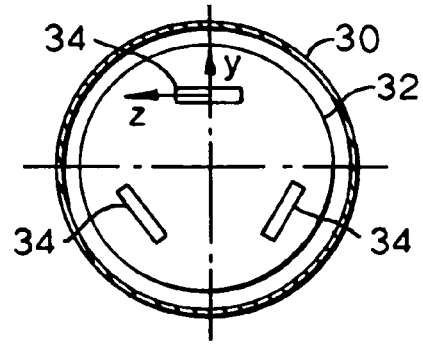
FIG. 6 is a view similar to FIG. 5 showing the coupling mechanism in a second state.

As shown by the expression $F=3 \cdot E \cdot I_{gz} \cdot x/L^3$, the flexion stiffness of the rods 34 depends on E and on $I_{gz}$. Thus, by modifying one and/or the other of these values, the flexion stiffness of the rods 34 can be varied. With reference to FIGS. 5 and 6, the mechanism 5 permits variation of $I_{gz}$ in the following manner: As explained above, the motor 35 is able to turn the rods 34 about their longitudinal axes. In the example illustrated, the rods 34 are cylindrical rods of rectangular section with sides h and b. Alternatively, any non-circular section may be suitable, for example a section in the form of an ellipse or triangle. Thus, the moment of inertia of the section relative to an axis depends on the axis in question. For example, in the case of the rectangular section, the moment of inertia relative to the axis z is $I_{gz}=b^3h/12$, and the moment of inertia relative to the axis y is $I_{gy}=bh^3/12$.

When the motor 35 places the rods 34 in the position shown in FIG. 5, the axis z corresponds to the axis Z of FIG. 12, and the moment $I_{gZ}$ is equal to the moment $I_{gz}$. In this state, the torsion stiffness of the device 2 is minimal. When the motor 35 places the rods 34 in the position shown in FIG. 6, the axis y corresponds to the axis Z of FIG. 12, and the moment $I_{gZ}$ is equal to the moment $I_{gy}$. In this state, the torsion stiffness of the device 2 is maximum. Thus, the device 2 has a variable stiffness, being able to adopt at least two distinct values.

In accordance with a modified embodiment, the motor 35 is able to position the rods 34 in more than two positions, corresponding to a plurality of different moments of inertia and therefore a plurality of different torsion stiffnesses. The mechanism 5 can then include a position sensor (not shown), for example a revolution counter linked to the motor 35, to determine in which position the rods 34 are placed, and to control the motor 35 in suitable fashion depending on the detected position and on a required position.

Figure 7:
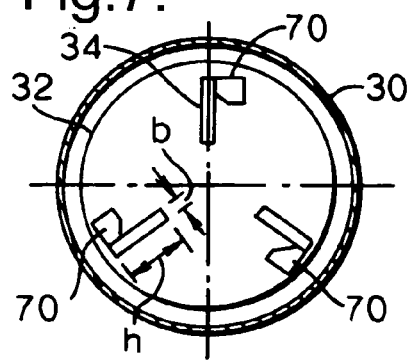
FIGS. 7 and 8 are views similar to FIGS. 5 and 6, showing a modified embodiment of the coupling of FIG. 3.
Figure 8:
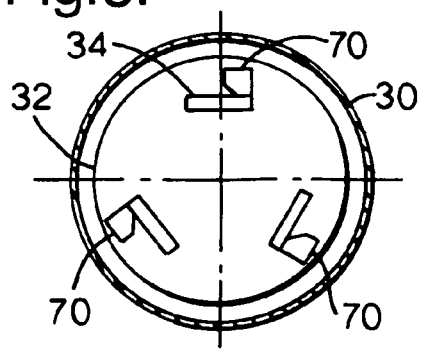

In accordance with another embodiment, shown in FIGS. 7 and 8, the mechanism 5 includes at least one stop 70 which defines two stop positions of the rods 34 corresponding to two torsion stiffnesses of the device 2. FIGS. 7 and 8 show three stops 70, fixed to the plate 32 and each co-operating with a rod 34. Preferably, in order to balance the mechanism 5, the transmission mechanism 36 is a synchronous mechanism, which always positions the different rods 34 in states corresponding to substantially equal flexion stiffnesses. In this case, there may be only one stop 70. Alternatively, the stop 70 could be arranged at the transmission mechanism 36 or at the motor 35. The stop 70 permits the use of a simple motor 35, able to position the rods 34 in one or the other of the stop positions. For example, to pass from one position to the other, the motor 35 turns the rods 34 until detection of a an excess power supply current corresponding to arrival in the stop position.

As mentioned above, to vary the flexion stiffness of the rods 34, the modulus of elasticity E can also be varied. For this purpose, as an alternative or complement to the non-circular section, the rods 34 can be made of an orthotropic material, i.e. a material which presents, for a given deformation, a modulus of elasticity which depends on the direction of the deformation. Orthotropic materials are generally composite materials. In this case, in a similar manner to that described above, the motor 35 is able to turn the rods 34 to position them in at least two different positions in which the flexion deformation occurs in directions in which the rods 34 have two different moduli of elasticity.

Figure 13:
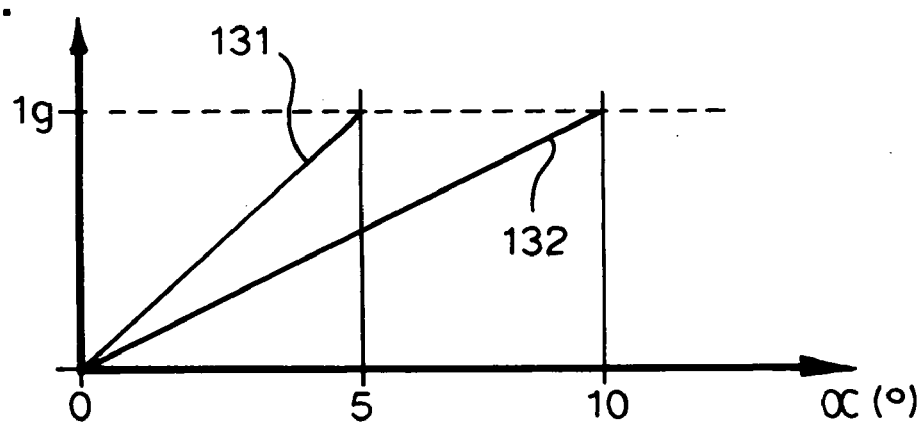
FIGS. 13 and 14 show examples of the roll behaviour of the vehicle of FIG. 1, in accordance with two modified embodiments.

FIG. 13 is a graph which illustrates an example of the behaviour of the vehicle 1, which can be obtained in the case of a mechanism 5 with two states such as shown in FIGS. 7 and 8, corresponding to a minimum and maximum torsion stiffness respectively. In this case, the mechanism 5 is, for example, so dimensioned that its maximum torsion stiffness corresponds to the torsion stiffness of a conventional anti-roll bar in accordance with the prior art.

Such dimensioning can for example be suitable for a four wheel drive vehicle. In the light of the above expressions, the man skilled in the art will be able to create such dimensioning.

FIG. 13 shows the link between the lateral acceleration of the vehicle 1 and the angle of roll α. The curve 131 shows this relationship when the mechanism 5 is in the state of FIG. 8, and the curve 132 shows this relationship when the mechanism is in the state of FIG. 7. In the state of FIG. 8, the behaviour of the vehicle 1 corresponds to that of a vehicle fitted with a conventional anti-roll bar, to which the driver of the vehicle 1 is used. In the state of FIG. 7, the torsion stiffness of the device 2 is lesser. This results, for a given lateral acceleration, in a larger angle of roll α. In this state, the coupling between the two wheels 8 is weaker. A shock to one of the wheels 8 will therefore be poorly transmitted to the other wheel. This results in improved comfort. A weaker coupling also presents an advantage in the case of driving the vehicle 1 over uneven terrain. In this case, the heights of each wheel 8 relative to the body 9 vary regularly by a large amplitude, and a reduced coupling involves improved comfort.

Figure 14:
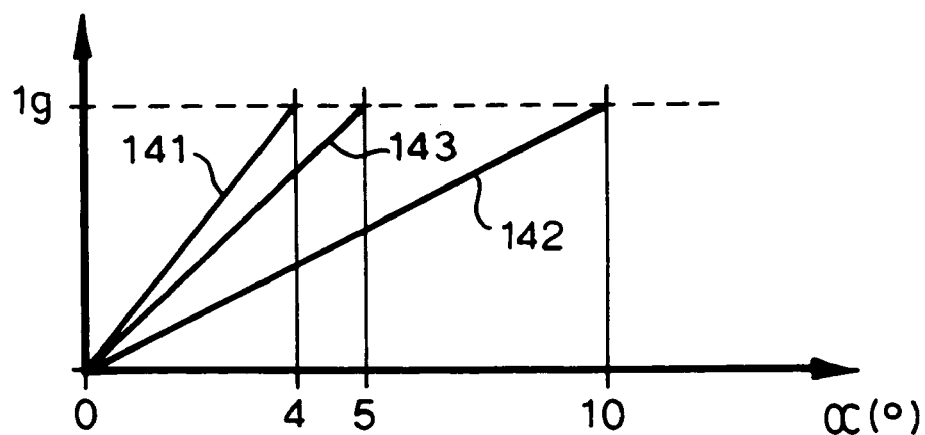

FIG. 14 is a view similar to FIG. 13, in the case of a coupling mechanism 5 able to position the rods 34 in a plurality of states corresponding to a plurality or torsion stiffnesses. The curve 141 corresponds to the mechanism 5 in the state of FIG. 6, and the curve 142 corresponds to the mechanism 5 in the state of FIG. 5. In this case, the mechanism 5 is for example dimensioned so that the torsion stiffness in the state of FIG. 6 is greater than the torsion stiffness of a conventional anti-roll bar in accordance with the prior art. A greater torsion stiffness offers better roll attenuation. The rods 34 of the mechanism 5 can be positioned in a plurality of states, corresponding to a plurality of torsion stiffnesses. For each torsion stiffness, a corresponding curve can be traced, situated between the curves 141 and 142. For example, the curve 143 corresponds to a position of the rods 34 in which the torsion stiffness of the device 2 corresponds to that of the conventional anti-roll bar. The coupling mechanism 5 therefore permits adjustment of the torsion stiffness of the device 2 between two limit values. For a given driving situation, a torsion stiffness can be selected corresponding to an appropriate compromise between roll attenuation and attenuation of the transmission of a shock from one wheel 8 to the other.

As has been seen, the motor 35 permits modification of the torsion stiffness of the device 2. In accordance with a modified embodiment, the device 2 includes a button, for example positioned on the dashboard of the vehicle 1, which allows the driver of the vehicle 1 to control the motor 35 to modify the torsion stiffness. For example, for a vehicle with four wheel drive, the state shown by the curve 131 (stiff state) is used on the road and the state shown by the curve 132 (flexible state) is used on uneven ground. In accordance with another modified embodiment, the device 2 includes a controller able to automatically control the motor 35 as a function of a state of the vehicle 1 determined by means of sensors. For this purpose, the device 2 can for example include a lateral acceleration sensor, a steering-wheel angle sensor, a vehicle speed sensor, etc.

The coupling mechanism 5 always has a residual torsion stiffness, which allows the device 2 to provide a minimum anti-roll effect even in the case of failure of the coupling mechanism 5. Moreover, the absence of a state corresponding to total decoupling, i.e. a zero torsion stiffness, has the advantage that it is always possible to pass from a minimum stiffness to a maximum stiffness and vice versa, even when the case 30 and the plate 32 are in relative rotation by a given angle, in so far as this angle is below a given threshold. However, in certain cases, it may be advantageous to have total decoupling between the two wheels 8. For this purpose, the mechanism 5 can be placed in series with a decoupling mechanism able to perform total decoupling.

In accordance with a modified embodiment of the coupling mechanism 5, the transmission mechanism 36 comprises a clutch able to decouple the motor 35 from the rods 34. If, on flexion of the rods 34, the clutch is in a disengaged state, the rods 34 will naturally be placed in the state of FIG. 5, corresponding to the minimum flexion stiffness. Thus, in accordance with this modification, to position the rods 34 in the position of FIG. 5, it is not necessary to actuate the motor 35, but only to disengage the clutch. In this modification, the transmission mechanism 36 is preferably irreversible. In fact, if the transmission mechanism is reversible, the clutch can be dispensed with and the rods 34 allowed to be placed in the state of FIG. 5 by not supplying power to the motor 35.

Although the invention has been described in connection with a particular embodiment, it is quite obvious that it is in no way limited to it and that it includes all the technical equivalents of the means described and their combinations, if these fall within the scope of the invention.

The invention claimed is:

1. An anti-roll bar for a vehicle comprising a first half-bar having a first end connected to a coupling mechanism and a second end adapted to be connected to a first vehicle wheel, and a second half-bar having a first end connected to the coupling mechanism and a second end adapted to be connected to a second vehicle wheel, said coupling mechanism comprising a first piece able to be fixed to the first half-bar, a second piece able to be fixed to the second half-bar, the second piece being so arranged as to be moveable in rotation about an axis of rotation A relative to the first piece, characterized by the fact that it includes at least one elastically deformable elongate element coupled to the first and second pieces so that relative rotation of the first and second pieces about the axis of rotation A causes elastic flexion deformation of the at least one elongate element, the mechanism including an actuator able to rotate the at least one elongate element relative to the first and second pieces from a first state in which the at least one elongate element presents a first flexion stiffness for the elastic flexion deformation to a second state in which the at least one elongate element presents a second flexion stiffness for the elastic flexion deformation.

2. An anti-roll bar as described in claim 1, wherein said at least one elongate element is arranged substantially parallel with the axis of rotation A of the first and second pieces, the at least one elongate element being coupled to the first and second pieces at coupling points situated distant from the axis of rotation A, the at least one elongate element being moveable in rotation at least about its longitudinal axis relative to the first and second pieces, the actuator being able to rotate the at least one elongate element about the longitudinal axis of the elongate element.

3. An anti-roll bar as described in claim 1, wherein said at least one elongate element has a cross-section which presents a first moment of inertia along a first axis z and a second moment of inertia along a second axis y, the elastic flexion deformation being a flexion perpendicularly to an axis of flexion Z, the first axis z corresponding to the flexion axis Z in the first state, the second axis y corresponding to the axis of flexion Z in the second state.

4. An anti-roll bar as described in claim 3, wherein said at least one elongate element is cylindrical of rectangular section.

5. An anti-roll bar as described in claim 1, wherein said at least one elongate element is made of orthotropic material.

6. An anti-roll bar as described in claim 1, further comprising at least one stop so arranged as to define the first state and/or the second state of the at least one elongate element.

7. An anti-roll bar as described in claim 1, wherein said actuator is able to position the at least one elongate element in a plurality of states corresponding, for the elastic flexion deformation, to a plurality of flexion stiffnesses of the at least one elongate element.

8. An anti-roll bar as described in claim 1, wherein said at least one elongate element is coupled rotatably to at least one of the first and second pieces, by a pivot connection, the actuator being able to cause the at least one elongate element to rotate.

9. An anti-roll bar as described in claim 1, wherein said at least one elongate element is rotatably coupled to one of the first and second pieces by a swivel joint connection.

10. An anti-roll bar as described in claim 1, wherein said mechanism comprises a plurality of elongate elements uniformly distributed about the axis of rotation A.

11. An anti-roll bar as described in claim 10, wherein said actuator is coupled to the elongate elements by a synchronous transmission mechanism co-operating with the actuator to jointly so position the elongate elements that all the elongate elements are always positioned in a substantially identical state corresponding to a substantially identical flexion stiffness, for the elastic flexion deformation.

12. An anti-roll bar as described in claim 1, wherein said actuator is coupled to the elongate elements by a transmission mechanism co-operating with the actuator to position the at least one elongate element, the transmission mechanism being an irreversible mechanism able to transmit a drive force from the actuator to the at least one elongate element without substantially transmitting the forces from the at least one elongate element to the actuator.

13. An anti-roll bar as described in claim 1, wherein said actuator is an electric motor.

14. An anti-roll bar as described in claim 1, wherein said first piece comprises a case protecting the actuator and the at least one elongate element, the actuator being fixed to the case.

15. An anti-roll bar having a torsion stiffness for a vehicle having a first vehicle wheel and a second vehicle wheel comprising;
- a coupling mechanism including a case and including a plate rotatable relative to said case,
- a first half-bar having a first end engaging said case of said coupling mechanism and a second end connected to the first vehicle wheel,
- a second half-bar having a first end engaging said plate of said coupling mechanism and a second end connected to the second vehicle wheel,
- at least one elongated element of an elastically deformable material extending between said case and said plate for elastically deforming in a first direction in response to rotation between said first and second half-bars engaging said case and said plate,
- said at least one elongated element having a cross-section being non-circular for presenting a first flexion stiffness in a one direction and for presenting a different second flexion stiffness in another direction,
- and characterized by
- an actuator for rotating said at least one elongated element relative to said case and said plate from a first state having the first flexion stiffness in said first direction when deforming in response to rotation between said first and second half-bars to a second state having the second flexion stiffness in said first direction when elastically deforming in response to rotation between said first and second half-bars to change said torsion stiffness of said anti-roll bar.

16. The anti-roll bar as set forth in claim 15 wherein said first and second half-bars are aligned along an axis A and said at least one elongated element is spaced radially from said axis A.

17. The anti-roll bar as set forth in claim 16 further including a plurality of elongated elements distributed around said axis A.

18. The anti-roll bar as set forth in claim 15 wherein said at least one elongated element is interconnected with said plate by a connection being at least one of pivot type and swivel joint.

19. The anti-roll bar as set forth in claim 15 further including a transmission mechanism for transmitting forces from said actuator to said at least one elongated element to rotate said at least one element.

20. The anti-roll bar as set forth in claim 19 wherein said transmission mechanism includes a plurality of gears.

21. The anti-roll bar as set forth in claim 20 wherein said gears of said transmission mechanism are planetary gears.

22. The anti-roll bar as set forth in claim 15 further including at least one stop for engaging said at least one elongated element to define at least one of said first and second states.

* * * * *